US012745773B2

(12) United States Patent
Claverie et al.

(10) Patent No.: US 12,745,773 B2
(45) Date of Patent: Sep. 29, 2026

(54) FUNGAL DISEASES REDUCTION AND YIELD IMPROVEMENT METHODS AND COMPOSITION THEREOF

(71) Applicant: ELICIT PLANT, Moulins-sur-Tardoire (FR)

(72) Inventors: Justine Claverie, Moulins-sur-Tardoire (FR); Felipe Sulzbach, Alphaville (BR); Karol Czelusniak, Alphaville (BR); Aymeric Molin, Moulins-sur-Tardoire (FR)

(73) Assignee: ELICIT PLANT, Moulins-sur-Tardoire (FR)

( * ) Notice: Subject to any disclaimer, the term of this patent is extended or adjusted under 35 U.S.C. 154(b) by 263 days.

(21) Appl. No.: 18/778,041

(22) Filed: Jul. 19, 2024

(65) Prior Publication Data

US 2026/0020568 A1 Jan. 22, 2026

(51) Int. Cl.

| | |
|---|---|
| ***A01N 45/00*** | (2006.01) |
| ***A01N 25/30*** | (2006.01) |
| ***A01P 3/00*** | (2006.01) |
| ***A01P 21/00*** | (2006.01) |

(52) U.S. Cl.

CPC ............. *A01N 45/00* (2013.01); *A01N 25/30* (2013.01); *A01P 3/00* (2021.08); *A01P 21/00* (2021.08)

(58) Field of Classification Search

CPC ............ A01P 3/00; A01P 21/00; A01N 25/30; A01N 5/00

USPC .......................................................... 504/353

IPC ....................................................... A01N 45/00

See application file for complete search history.

(56) References Cited

U.S. PATENT DOCUMENTS

| | | | |
|---|---|---|---|
| 4,789,398 | A | 12/1988 | Yamazaki et al. |
| 5,405,615 | A | 4/1995 | Mathur |
| 2002/0039971 | A1 | 4/2002 | Hayashi et al. |
| 2008/0102111 | A1 | 5/2008 | Imanaka |
| 2011/0100079 | A1 | 5/2011 | Kamei |
| 2014/0235441 | A1 | 8/2014 | Dietz et al. |
| 2016/0295868 | A1 | 10/2016 | Jones et al. |
| 2016/0302423 | A1 | 10/2016 | Jones et al. |
| 2020/0093134 | A1 | 3/2020 | Bellandi et al. |
| 2020/0163335 | A1 | 5/2020 | Fregonese et al. |
| 2020/0163338 | A1 | 5/2020 | Fregonese et al. |
| 2020/0236933 | A1 | 7/2020 | Fregonese et al. |
| 2023/0165254 | A1 | 6/2023 | Molin et al. |
| 2024/0023545 | A1 | 1/2024 | Molin et al. |

FOREIGN PATENT DOCUMENTS

| | | | |
|---|---|---|---|
| CN | 102603400 | A | 7/2012 |
| CN | 103563929 | A | 2/2014 |
| CN | 106889068 | A | 6/2017 |
| EP | 0289636 | A1 | 11/1988 |
| JP | S5724764 | A | 2/1982 |
| JP | H0789808 | A | 4/1995 |
| JP | 2699741 | B2 | 1/1998 |
| JP | 3313846 | B2 | 8/2002 |
| KR | 101170810 | B1 | 8/2012 |
| PL | 232367 | B1 | 6/2019 |
| WO | 01032031 | A2 | 5/2001 |
| WO | 02017892 | A2 | 3/2002 |
| WO | 2024074215 | A1 | 4/2024 |

OTHER PUBLICATIONS

Britt Erickson, "Elicit Plant: Phytosterols could boost crop yields under drought conditions." C&EN gen.acs.org Nov. 2023 (Year: 2023).*

CAS No. 136152-91-5, "α-D-Glucopyranoside, 1-O-(1-oxooctadecyl)-β-D-fructofuranosyl," Chemical Book, 2023 [retrieved on Jul. 29, 2024]. Retrieved from the Internet: <URL:https://www.chemicalbook.com/ProductChemicalPropertiesCB512027485_EN.htm>, 1 page.

CAS No. 8002-43-5, "Lecithins," CAS Common Chemistry, 2024 [retrieved on Jul. 29, 2024]. Retrieved from the Internet: <URL:https://commonchemistry.cas.org/detail?cas_rn=8002-43-5&search=8002-43-5>, 2 pages.

CAS No. 949109-75-5, "Plant Sterols," European Chemicals Agency, 2023 [retrieved on Jul. 29, 2024]. Retrieved from the Internet: <URL:https://echa.europa.eu/registration-dossier/-/registered-dossier/14742>, 19 pages.

CAS No. 949109-75-5, "PLANTSTEROLS," Chemical Book, 2023 [retrieved on Jul. 29, 2024]. Retrieved from the Internet: <URL:https://www.chemicalbook.com/CASEN_949109-75-5.htm>, 2 pages.

Fawzia AE, Ashraf AE, Samia AH, Hend AE, Nora FS. β-sitosterol ameliorates the chemical constituents of sunflower (*Helianthus annuus* L.) plants, grown under saline condition. IOSR J. Pharm. Biol. Sci. 2016; 11:36-45.

Griebel T, Zeier J. A role for β-sitosterol to stigmasterol conversion in plant-pathogen interactions. The Plant Journal. Jul. 2010;63(2):254-68.

Kopcewicz J. Influence of steroids on the growth of the dwarf pea. Die Naturwissenschaften. May 1969;56(5):287.

Steber CM, McCourt P. A role for brassinosteroids in germination in *Arabidopsis*. Plant physiology. Feb. 1, 2001;125 (2):763-9.

Vriet C, Russinova E, Reuzeau C. Boosting crop yields with plant steroids. The Plant Cell. Mar. 1, 2012;24(3):842-57.

* cited by examiner

*Primary Examiner* — Walter E Webb

(74) *Attorney, Agent, or Firm* — McKee, Voorhees & Sease, PLC

(57) ABSTRACT

The invention relates to a method of cultivating soybean exposed to at least one fungal disease comprising a step of applying to said cultivated soybean an effective treatment with at least one organo-chemical fungicide in combination with at least two applications of a phytosterol composition comprising at least one phytosterol and at least one sucrose fatty acid ester to increase the yield of said cultivated soybean and/or to reduce the effects of said at least one fungal disease in comparison to soybeans under similar conditions treated only with the organo-chemical fungicide treatment.

20 Claims, No Drawings

FUNGAL DISEASES REDUCTION AND YIELD IMPROVEMENT METHODS AND COMPOSITION THEREOF

FIELD OF THE INVENTION

The invention relates to the prevention or the resolution of adverse effect of various diseases that soybean (*Glycine max*) may be subjected during its lifecycle. Currently, such diseases are treated by successive applications of combinations of pesticides, but even with these combinations the harvest yield may not be guaranteed. Hence, the invention relates to a method of cultivating soybean exposed to at least one fungal disease, using a phytosterol composition mixed with at least one organo-chemical fungicide, thus increasing the harvest yield and controlling the said fungal disease.

STATE OF THE ART

Soybean (*Glycine max*) is one of the most cultivated legumes worldwide, thanks to its numerous uses in human food and livestock feeding. Brazil notably has become the main producer since 2010, and Brazil together with the USA account for more than 60% of the cumulated production.

Despite its strategic necessity, soybean is highly sensitive to both abiotic and biotic stresses. In particular, soybean plants may be subjected to a variety of diseases and pests. In descending order of criticality but not in an exhaustive fashion, harvest yields can be affected by the following fungal diseases, resulting from the fungal pathogen:

- Asian soybean rust (*Phakopsora pachyrhizi*)
- Target spot (*Corynespora cassiicola*)
- Powdery mildew (*Erysiphe diffusa*)
- Anthracnose (*Colletotrichum truncatum*)
- Purple seed stain and *cercospora* leaf blight (*Cercospora kikuchii*)
- Brown spot (*Septoria glycines*)
- New World soybean rust (*Phakopsora meibomiae*)

Asian soybean rust (*Phakopsora pachyrhizi*) is of most concern as it is able to cause dramatic yield losses of soybean, which can impact up to the totality of the expected harvest. This disease is currently particularly active in the Americas, but infectious spots are also reported in many other countries around the world.

To fight against the above mentioned diseases, farmers may use several technical options, but it has become a necessity to spread fungicides, in particular organo-chemical fungicides, multiple times, both in protective and curative ways. In other words, there is no current intensive soybean cultivation which does not use fungicides. These organo-chemical fungicides are usually combined because of the possibility to use different modes of action against the fungus:

- DMI: Demethylation inhibitor, also known as Sterol biosynthesis inhibitor (SBI)
- $Q_o$I: quinone outside inhibitor,
- SDHI: succinate dehydrogenase,
- Multisite action.

These organo-chemical fungicides can also be sorted according to their main chemical structure: strobilurins, chloronitriles, carbamates and analogues (especially dithiocarbamates), and triazoles. Among these, strobilurins and triazoles are among the most effective for managing soybean diseases and, sometimes, maintaining yield over diverse locations. They can be used alone but they work better when mixed, so as to fight against the fungus either at the sporulation stage ($Q_o$Is) or at the growth stage (DMIs).

However, when mixed and in the case of Asian soybean rust, the treatment may not be effective in controlling the disease and improving yields at the same time. In other words, the application of organo-chemical fungicides can control the severity of the disease without guaranteeing yields, i.e. yields similar to or even higher than those of a plant grown in the same soil and climate conditions but not exposed to the disease.

Controlling a disease is highly dependent to its nature and the period organo-chemical fungicides are applied. Moreover, these recent years have seen a loss of their efficiency due to acquired resistance of Asian soybean rust, even for the most efficient $Q_o$I- or DMI-based treatments. Another issue related with organo-chemical fungicides is their mode of action based on protection which requires several and frequent applications so as to remain on the leaf surface.

Besides, it appears that controlling the severity of a disease does not necessarily mean that yields will be maintained or increased.

In this context, there is a need to find a treatment method which would allow both a mitigation of the disease and a preservation or an improve of the harvest yield, whether the treatment is applied preventively (i.e., before the emergence of the disease) or curatively. For instance, Asian soybean rust usually appears at blooming.

DISCLOSURE OF THE INVENTION

Definitions

As used therein, the expressions "prophylactic treatment" and "preventive treatment" may be used interchangeably and mean a treatment which is intended to prevent a disease. In the context of the invention, this preventive treatment is performed at the vegetative state of soybean, that is to say before blooming.

As used therein, the expressions "effective treatment" and "effective amount" refer to the quantities and dosages necessary to achieve the desired result, i.e. increase the yield of said cultivated soybean and/or reduce the effects/the severity of said fungal disease on said field of cultivated soybean in comparison to soybeans under similar conditions treated only with the organo-chemical fungicide treatment.

As used therein, the expression "curative treatment" means a treatment which is intended to cure an existing disease. In the context of the invention, this curative treatment is performed after blooming.

As used therein, the expressions "combined" or "in combination with" refer to an association of at least two compounds, the said two compounds being combined one prior to the other, the two concomitantly, or one after a step of another. In other words, these expressions encompass a sequence of application of the said at least 2 compounds, i.e. the first compound before the second compound, the first compound after the second compound or at least two compounds applied concomitantly, either in the form of a single product, i.e. a mixture of the at least 2 compounds, including an extemporaneous mixture.

As used therein, the expression "treated" plant or crop refers to a plant or crop which is preventively or curatively treated with the composition used in the method of the invention and which undergoes growth while being exposed to one or more diseases.

As used herein, the expression "untreated" plant or crop may be used interchangeably and refers to a plant or crop which is untreated with the composition used in the method of the invention and which undergoes growth by being exposed to the same one or more diseases as the treated crops.

As used therein, the expression "biotic stress" refers to a damage performed on a cultivated crop by living organisms, such as bacteria, viruses, fungi, parasites, insects and weeds.

As used therein, the expressions "prior to the onset of a biotic stress" and "prior to the exposure to a biotic stress", may be used interchangeably and refer to the period during which the plant has not been attacked thus far by any living organism, i.e. before the first symptoms appear, for example before the first spots or degraded material appear on the leaves and/or stems of the cultivated plant.

As used therein, the phrase "severity of the fungal disease" refers to the average severity of the disease on all of the leaves of the cultivated soybean. The severity of the disease on one leaf is the surface area of the leaf that is covered by the disease, for example for Asian soybean rust, and is expressed in percentage, relative to the total plant tissue that is considered in the measurement.

As used therein, the terms "efficiency" and "control" can be used interchangeably and refer to the capacity of a composition used in the method of the invention to mitigate the severity of a disease in cultivated soybean in comparison to cultivated soybean under similar conditions but not treated with such composition.

As used therein, "fungicide" refers to an organo-chemical fungicide, as opposite to microbial, inorganic or natural fungicides (vegetal or mineral oils).

As used therein, an "organo-chemical fungicide treatment sequence" refers to an iterative treatment of the cultivated soybeans by organo-chemical fungicides at different stage of the plant's development, the organo-chemical fungicides used at each iteration being the same or different or in different combinations.

As used therein, the expressions "plant sterol" and "phytosterol" may be used indifferently and refer to any vegetally-occurring or chemically-synthesized sterol.

As used therein, the expression "sterol" refers to any vegetally-, animally-occurring, or chemically-synthesized sterol. The expression "sterol" therefore embraces the expression "plant sterol".

As used therein, the expression "phytosterol composition" refers to a composition comprising at least one phytosterol and at least one sucrose fatty acid ester.

As used therein, cholesterol can be indifferently considered as a vegetally- or an animally-occurring sterol, since this sterol can be found both in some vegetals and in some animals.

As used herein, the terms "yield" or "harvest yield" refer to the amount of product harvested, more precisely the seed of harvested soybeans.

As used herein, the term "cultivated soybean," in contrast to a naturally existing soybean, refers to soybean that can be cultivated, i.e., sown, planted, and exploited by man.

As used therein, the terms "crops" and "plants" may be used indifferently and refer to all plants and plant populations such as desirable and undesirable wild plants, cultivars, and plant varieties (whether or not protectable by plant variety or plant breeder's rights). Cultivars and plant varieties can be plants obtained by conventional propagation and breeding methods which can be assisted or supplemented by one or more biotechnological methods such as by use of double haploids, protoplast fusion, random and directed mutagenesis, molecular or genetic markers or by bioengineering and genetic engineering methods.

As used therein, the term "plant" includes whole plants and parts thereof, including, but not limited to, shoot vegetative organs/structures (e.g., leaves, stems and tubers), roots, flowers and floral organs/structures (e.g., bracts, sepals, petals, stamens, carpels, anthers and ovules), seeds (including embryo, endosperm, and seed coat) and fruits (the mature ovary), plant tissues (e.g., vascular tissue, ground tissue, and the like) and cells (e.g., guard cells, egg cells, and the like), and progeny of same. "Fruit" and "plant produce" are to be understood as any plant product which is further utilized after harvesting, e.g., fruits in the proper sense, nuts, wood etc., that is anything of economic value produced by the plant.

As used therein, the term "slurry" refers to the composition of the invention diluted in water or in a solution containing water and, optionally one or more other active ingredients.

As used therein, the term "tank-mix" means that active ingredients are mixed in the water tank to form the slurry, which is then being sprayed on the plants.

As used herein, "biocontrol product" is defined as an agent or product that uses natural mechanisms. They form a set of tools that can be used, alone or in combination with other plant protection methods, to combat crop enemies in integrated pest management.

As used therein, "Dikarya" is a subkingdom of Fungi that includes the divisions Ascomycota and Basidiomycota.

As used therein, the expression "foliar spray" refers to a pressurized projection of a slurry that forms numerous microdroplets that cover the upper and/or lower surfaces of the treated leaf.

The use of "a" or "an" for a molecule does not exclude, unless otherwise stated, the presence of plurality of molecules, in such a way that the expression "one or more" can be substituted for it.

As used therein, the expression "insoluble in the aqueous phase" refers to a compound which presents the inability to form with water a homogenous, one-phase solution at the microscopic or the macroscopic level, at a given temperature and atmospheric pressure.

By contrast and as used therein, the term "solubility" refers to a compound which leads to a homogenous solution without remaining insoluble particles when it is added to a liquid, at a given temperature and atmospheric pressure.

Any percentage by weight of a molecule comprises in the composition used in the method of the invention refers to the total weight of the said composition, which means relative to the sum of all ingredients giving a hundred. Weight percent can be symbolized as wt %.

Various aspects of the invention can be presented in a range format. The description in range format is merely for convenience and conciseness and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DETAILED DESCRIPTION OF THE INVENTION

It is an object of the present invention to provide a method of cultivating soybean exposed to at least one fungal disease comprising a step of applying to said cultivated soybean an effective treatment with at least one organo-chemical fungicide in combination with a phytosterol composition comprising at least one phytosterol and at least one sucrose fatty acid ester, wherein at least two applications of said phytosterol composition are combined with at least two applications of said treatment with at least one organo-chemical fungicide, and wherein the treatment with said combination increases the yield of said cultivated soybean in comparison to soybeans under similar conditions but treated only with the organo-chemical fungicide treatment.

It is also another object of the invention to provide a method of controlling at least a fungal disease of cultivated soybean comprising a step of applying to said cultivated soybean an effective treatment with at least one organo-chemical fungicide in combination with a phytosterol composition comprising at least one phytosterol and at least one sucrose fatty acid ester, wherein at least two applications of said phytosterol composition are combined with at least two applications of said treatment with at least one organo-chemical fungicide, and wherein the treatment with said combination reduced the effects of said at least one fungal disease on said field of cultivated soybean in comparison to soybeans under similar conditions only treated with the organo-chemical fungicide treatment.

The Applicant has thus ascertained that, most surprisingly, the harvest yield and/or the disease control of cultivated soybean could be improved with a method comprising a step of incorporating at least two applications to the said soybean of a composition comprising at least one phytosterol and at least one sucrose fatty acid ester into an organo-chemical fungicide treatment sequence.

It was observed that the phytosterol composition used in the method of the invention, when combined with at least one organo-chemical fungicide reduced the severity of soybean diseases when it was applied prior to the onset of such diseases, that is to say before their emergence, which usually happen during or after the flowering stage of soybean.

It was also observed that the phytosterol composition used in the method of the invention, when combined with at least one organo-chemical fungicide controlled the severity of soybean diseases when it was applied after the emergence of such diseases, thereby limiting the intensity of the disease, thus its potential damage on soybean.

According to the method of the invention, this control of the soybean disease is one of the ways to improve the harvest yield of cultivated soybean.

The phytosterol composition in combination with at least one organo-chemical fungicide can be applied to the cultivated soybean at least twice. It was observed that a stand-alone application of the phytosterol composition (i.e., without being combined with any organo-chemical fungicide) cannot afford a sufficient control of the soybean diseases to afford a suitable protection, and/or an increase of the yield. It was also observed that combining the at least one organo-chemical fungicide in combination with a phytosterol composition and applying them only once allows one a slight increase of the harvest yield and/or of the control of the at least one fungal disease. This is why the invention relies on at least two applications of said phytosterol composition combined with at least two applications of said treatment with at least one organo-chemical fungicide to effectively/significantly increase the harvest yield and the protection against at least one fungal disease.

A first possibility is to apply one of the two applications of the combination of at least one organo-chemical fungicide with a phytosterol composition comprising at least one phytosterol and at least one sucrose fatty acid ester before the onset of the disease, that is to say before blooming, for example one application at physiological stage V4 and one application at or after physiological stage R1, according to the Growth stages American literature. Irrelevant from the number of applications, the said at least two applications of a phytosterol composition comprising at least one phytosterol and at least one sucrose fatty acid ester is applied between physiological stage V3 and R5, more preferably between physiological stage R1 and R3.

According to the method of the invention, said at least two applications of said phytosterol composition comprising at least one phytosterol and at least one sucrose fatty acid ester is applied prior to, concomitantly, or after the application of the at least one organo-chemical fungicide.

The combination of at least one organo-chemical fungicide with a phytosterol composition comprising at least one phytosterol and at least one sucrose fatty acid ester is particularly suitable for the prophylactic and/or the curative treatment of any fungal disease whose origin is related to the Dikarya sub-kingdom, more advantageously, to the division Basidiomycota or Ascomycota, preferably from the class selected from Pucciniomycetes, Sordariomycetes, Dothideomycetes or Leotiomycetes. It is particularly effective against Asian soybean rust, anthracnose, target spot, powdery mildew, *Cercospora* leaf blight and end-cycle diseases such as purple seed stain and brown spot, and combination thereof, advantageously Asian soybean rust.

Asian soybean rust is caused by a biotrophic pathogen, i.e. the fungus *Phakopsora pachyrhizi; Cercospora* leaf blight is caused by the fungus *Cercospora kukuchii* and/or *Cercospora flagellaris*; purple seed stain (also known by the names purple blotch, purple speck, purple spot or lavender spot) is caused by the fungus *Cercospora kikuchii*; anthracnose is caused by several species of *Colletotrichum* fungi including the fungus *Colletotrichum truncatum*; target spot is caused by the fungus *Corynespora cassiicola*; powdery mildew is caused by the fungus *Microsphaera diffusa*; brown spot (also known by the name *Septoria* Brown Spot) is caused by the fungus *Septoria glycines*.

The phytosterol composition can be applied in combination with at least one or more other organo-chemical fungicides.

The Applicant has assumed that the plant response against soybean diseases is systemic, that is to say the phytosterols have to penetrate soybean tissues to make the plant become more resilient to the detrimental effects of the said diseases. To reach this, at least one sucrose fatty acid ester is added to the phytosterol composition to improve the foliar uptake of the said at least one phytosterol. Thus, the phytosterol composition comprises at least one phytosterol and at least one sucrose fatty acid esters.

So far, more than 250 different phytosterols have been identified. The at least one phytosterol can be selected among the group of:

- plant sterols: beta-sitosterol, campesterol, brassicasterol, stigmasterol, lanosterol, stigmastanol, campestanol, cycloartenol, gamma-sitosterol, $\Delta^5$-avenasterol, $\Delta^7$-avenasterol, isofucosterol, 5-dihydropteroyl, cycloartenol, clerosterol, sitostanol, stigmastadienol, ergosterol, isomers and derivatives thereof;
- zoosterols: cholesterol, cholestanol, dinosterol, and derivatives thereof;
- mycosterols: ergosterol, obtusifoliol, and derivatives thereof.

Preferably, the at least one phytosterol is chosen among the group of: beta-sitosterol, campesterol, brassicasterol, stigmasterol and/or cholesterol. Advantageously, beta-sitosterol represents at least 30% of the phytosterols mixture by weight, with the balance to 100% preferably containing, where appropriate, campesterol, stigmasterol and brassicasterol.

According to a specific embodiment, the at least one phytosterol represents between 0.2% and 10% by weight of the total composition, advantageously between 0.5% and 7%, and preferably between 1% and 5%.

The at least one sucrose fatty acid ester is selected from the group consisting of saccharose stearate, saccharose palmitate, their polyesters, and mixtures thereof.

The concentration of the at least one sucrose fatty acid ester represents between 0.2% and 10% by weight of the total composition, advantageously between 3% and 7%.

According to a specific embodiment, the weight ratio of the at least one phytosterol to the at least one sucrose fatty acid ester is between 0.01 and 10, advantageously between 0.1 and 5, more advantageously between 0.2 and 1.5.

The agricultural composition of the invention can take the form of a homogenous or heterogenous aqueous solution, an emulsifiable concentrate, a concentrated suspension, an oil-in-water or a water-in-oil emulsion, an oil-in-water or a water-in-oil suspo-emulsion, an oil dispersion and/or any other formulation the skilled artisan may find suitable for the invention purpose. Preferably, the agricultural composition of the invention is an aqueous solution, an emulsion or a suspo-emulsion.

According to a specific embodiment, the phytosterol composition is a suspo-emulsion, which comprises at least one phytosterol and at least one sucrose fatty acid ester selected from the group consisting of sucrose stearate, saccharose palmitate and their polyesters, or mixtures thereof, acting either as surfactant in an oil-in-water emulsion, and a free surfactant which is then added to the said emulsion as a suspension. In one embodiment, the surfactant acting in the oil-in-water emulsion and the surfactant acting as a free surfactant are identical, e.g. sucrose stearate for both. In another embodiment, the surfactant acting in the oil-in-water emulsion and the surfactant acting as a free surfactant are different, e.g. sucrose stearate acting in the oil-in-water emulsion and saccharose palmitate as a free surfactant.

In another aspect of the invention, the skilled artisan may add to the phytosterol composition used in the method of the invention further molecules which would improve the efficiency of the said composition to treat soybean diseases, that is to say at least one fluidifying agent, at least one solubilizing agent for phytosterols (also called fatty substance), at least one wetting agent, at least one preservative and/or at least one antioxidant.

According to a specific embodiment, the mixture of at least one phytosterol and the at least one sucrose fatty acid ester comprised in the composition used in the method of the invention is combined with at least one active ingredient. For the purposes of the invention, the term “active ingredient” refers to a product that helps the plant to fight against soybean diseases and/or to grow, advantageously selected from the group comprising:

- a phytopharmaceutical product such as a plant growth regulator, a fungicide, in particular an organo-chemical fungicide traditionally used in an organo-chemical fungicide treatment sequence, a fungistatic agent, a bactericide, a bacteriostatic agent, an insecticide, an acaricide, a parasiticide, a nematicide, a mole toxicant or a herbicide;
- a biocontrol product based on natural mechanisms that enables plants to combat fungal infections, bacterial infections, viral infections, pest attacks and/or competition with weeds; and/or
- a nutrient, organic or inorganic such as a micronutrient or a fertilizer.

More preferentially, the composition of the invention can be combined with at least one fungicide, in particular an organo-chemical fungicide and/or at least one nutrient.

Organo-Chemical Fungicides May be Selected Among the Group Consisting of:

1. Respiration inhibitors
a. Inhibitors of complex III at Qo site (e.g., strobilurins): azoxystrobin, coumethoxystrobin, coumoxystrobin, dimoxystrobin, enestroburin, famoxadone, fenamidone, fenaminstrobin, fenoxystrobin/flufenoxystrobin, fluoxastrobin, kresoxim-methyl, metominostrobin, orysastrobin, picoxystrobin, pyraclostrobin, pyrametostrobin, pyraoxystrobin, trifloxystrobin, pyribencarb, triclopyricarb/chlorodincarb;
b. inhibitors of complex III at Qi site: cyazofamid, amisulbrom,
c. inhibitors of complex II (e.g. carboxamides): benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane, tecloftalam, thifluzamide, benzovindiflupyr, inpyrfluxam, isofetamid, pydiflumetofen, fluindapyr;
d. complex I, uncouplers: diflumetorim;
e. nitrophenyl derivates: binapacryl, dinobuton, dinocap, fluazinam, ferimzone;
f. organometallic compounds: fentin acetate, fentin chloride, fentin hydroxide;
g. ametoctradin, silthiofam;
2. Sterol biosynthesis inhibitors (SBI fungicides)
a. C14 demethylase inhibitors (DMI fungicides):
i. triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, mefentrifluconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole;
ii. imidazoles: imazalil, pefurazoate, prochloraz, triflumizol;
iii. pyrimidines, pyridines and piperazines: fenarimol, nuarimol, pyrifenox, triforine;
b. Delta 14-reductase inhibitors: aldimorph, dodemorph, dodemorph-acetate, fenpropimorph, tridemorph, fenpropidin, piperalin, spiroxamine;
c. inhibitors of 3-keto reductase: fenhexamid;
3. Nucleic acid synthesis inhibitors
a. phenylamides or acyl amino acid fungicides: benalaxyl, benalaxyl-M, kiralaxyl, metalaxyl, ofurace, oxadixyl;
b. others: hymexazole, octhilinone, oxolinic acid, bupirimate, 5-fluorocytosine;
4. Inhibitors of cell division and cytoskeleton
a. tubulin inhibitors: benzimidazoles, thiophanates: benomyl, carbendazim, fuberidazole, thiabendazole, thiophanate-methyl, triazolopyrimidines;
b. cell division inhibitors: diethofencarb, ethaboxam, pencycuron, fluopicolide, zoxamide, metrafenone, pyriofenone;

5. Inhibitors of amino acid and protein synthesis
   a. methionine synthesis inhibitors (anilino-pyrimidines): cyprodinil, mepanipyrim, pyrimethanil;
   b. protein synthesis inhibitors: blasticidin-S, kasugamycin, kasugamycin hydrochloride-hydrate, mildiomycin, streptomycin, oxytetracyclin, polyoxin, validamycin A;
6. Signal transduction inhibitors
   a. MAP/histidine kinase inhibitors: fluoroimide, iprodione, procymidone, vinclozolin, fenpiclonil, fludioxonil;
   b. G protein inhibitors: quinoxyfen;
7. Lipid and membrane synthesis inhibitors
   a. phospholipid biosynthesis inhibitors: edifenphos, iprobenfos, pyrazophos, isoprothiolane;
   b. lipid peroxidation: dicloran, quintozene, tecnazene, tolclofos-methyl, biphenyl, chloroneb, etridiazole;
   c. phospholipid biosynthesis and cell wall deposition: dimethomorph, flumorph, mandipropamid, pyrimorph, benthiavalicarb, iprovalicarb, valifenalate;
   d. compounds affecting cell membrane permeability and fatty acids: propamocarb, propamocarb-hydrochlorid fatty acid amide;
8. Inhibitors with Multi Site Action
   a. thio- and dithiocarbamates: ferbam, mancozeb, maneb, metam, metiram, propineb, thiram, zineb, ziram;
   b. chlorinated organic compounds (e.g. phthalimides, sulfamides, chloronitriles): anilazine, chlorothalonil, captafol, captan, folpet, dichlofluanid, dichlorophen, hexachlorobenzene, pentachlorophenol and its salts, phthalide, tolylfluanid, and others: guanidine, dodine, dodine free base, guazatine, guazatine-acetate, iminoctadine, iminoctadine-triacetate, iminoctadinetris(albesilate), dithianon;
9. Cell wall synthesis inhibitors
   a. inhibitors of glucan synthesis: validamycin, polyoxin B;
   b. melanin synthesis inhibitors: pyroquilon, tricyclazole, carpropamid, dicyclomet, fenoxanil;
10. Plant defense inducers
   a. acibenzolar-S-methyl, probenazole, isotianil, tiadinil, prohexadione-calcium;
   b. phosphonates: fosetyl, fosetyl-aluminum;
11. Unknown mode of action: bronopol, chinomethionat, cyflufenamid, cymoxanil, dazomet, debacarb, diclomezine, difenzoquat, difenzoquat methylsulfate, diphenylamine, fenpyrazamine, flumetover, flusulfamide, flutianil, methasulfocarb, nitrapyrine, nitrothal-isopropyl, oxine-copper, picarbutrazox, proquinazid, tebufloquin, tecloftalam, triazoxide.

An aspect of the invention is to provide a method wherein the phytosterol composition is mixed with at least one organo-chemical fungicide.

According to the method of the invention, the effective treatment with at least one organo-chemical fungicide is a standard treatment with respect to regime and dosage as recommended for the treatment of soybean.

According to a specific embodiment, the effective treatment with at least one organo-chemical fungicide comprises between 50% and 100% of the organo-chemical fungicide amount applied in a standard treatment.

According to a specific embodiment, the phytosterol composition used in the method of the invention is combined, advantageously mixed, with strobilurins, carboxamides, triazoles and/or chloronitriles.

Nutrients can be chosen among the group consisting of nitrogen (N), phosphorus (P), potassium (K), sulfur(S), calcium (Ca), magnesium (Mg), copper (Cu), iron (Fe), manganese (Mn), zinc (Zn), boron (B), chloride (CI), cobalt (Co), molybdenum (Mo) and/or nickel (Ni).

According to a specific embodiment, the phytosterol composition used in the method of the invention is combined, advantageously mixed, with nitrogen, molybdenum and boron.

According to another specific embodiment, the phytosterol composition used in the method of the invention is combined, advantageously mixed, with cobalt, molybdenum and boron.

According to another specific embodiment, the phytosterol composition used in the method of the invention is combined, advantageously mixed, with nitrogen and boron.

According to another specific embodiment, the phytosterol composition used in the method of the invention is combined, advantageously mixed, with molybdenum and boron.

Another aspect of the invention is to provide a method to treat in a prophylactic way and/or in a curative way soybean against soybean diseases, by at least two applications of the phytosterol composition above described, preferably between two and four applications.

In one embodiment, the method consists in applying to the soybean plant a foliar spray of a dilution of at least one organo-chemical fungicide in combination with a phytosterol composition comprising at least one phytosterol and at least one sucrose fatty acid ester, prior to or after the onset of the disease. Irrelevant from the number of applications, this treatment with said combination is performed at a total concentration of said at least one phytosterol between 2.5 g/ha to 250 g/ha, preferably between 12.5 and 125 g/ha, more preferably between 25 g/ha and 100 g/ha, the said concentration being expressed in grams per hectare of phytosterol.

In another embodiment, the at least two applications of said phytosterol composition are combined with at least two applications of said treatment with at least one organo-chemical fungicide. Combined means that the each of said application of said phytosterol composition may occur prior to, concomitantly or after the step of each said application of said treatment with at least one organo-chemical fungicide. For Example,

- the first application of the phytosterol composition is applied concomitantly with the first application of the at least one organo-chemical fungicide, the second application of the phytosterol composition is applied concomitantly with the second application of the at least one organo-chemical fungicide; or
- the first application of the phytosterol composition is applied before the first application of the at least one organo-chemical fungicide, the second application of the phytosterol composition is applied concomitantly with the second application of the at least one organo-chemical fungicide; or
- the first application of the phytosterol composition is applied after the first application of the at least one organo-chemical fungicide, the second application of the phytosterol composition is applied concomitantly with the second application of the at least one organo-chemical fungicide; or
- the first application of the phytosterol composition is applied concomitantly with the first application of the at least one organo-chemical fungicide, the second application of the phytosterol composition is applied before the second application of the at least one organo-chemical fungicide; or the first application of the phytosterol composition is applied concomitantly with the first application of the at least one organo-chemical fungicide, the second application of the phytosterol composition is applied after the second application of the at least one organo-chemical fungicide.

In a preferred embodiment, at least a third, or preferentially the half of the total applications of the sequence of treatment is performed with a concomitant combination of at least one organo-chemical fungicide with a phytosterol composition comprising at least one phytosterol and at least one sucrose fatty acid ester.

According to one aspect, the invention relates to a slurry resulting from the dilution of the phytosterol composition in combination with at least one organo-chemical fungicide as previously described to be applied on soybean so as to improve yield and/or to control diseases. This slurry is performed by diluting the said combination, usually in water, at a concentration ranging from 0.001% to 50%, advantageously from 0.01% to 10%, preferably from 0.1% to 5%.

One option is to tank-mix the phytosterol-based composition with at least one active ingredient, in particular at least one fungicide, and then to dilute the mix in water (in all possible orders) to prepare the slurry. Another option is to dilute the phytosterol composition in order to obtain the slurry and only then, to add to the slurry the at least one organo-chemical fungicide. Another option is to dilute in water a pre-mix comprising at least one organo-chemical fungicide with the phytosterol composition. In such a case the phytosterol composition and the at least one organo-chemical fungicide are sprayed on soybean at the same time.

Another option is to perform the treatment of cultivated soybean with the phytosterol composition used in the method of the invention combined with at least one organo-chemical fungicide, but the said phytosterol composition (hereafter designed as "A") is not mixed in the same tank with the said at least one organo-chemical fungicide (hereafter designed as "B"). This option comprises one of these situations:

- A and B are in two or more different tanks but on the same vehicle, the vehicle being a human, an animal, a flying or driving machine carrying or comprising any equipment suitable to spray a liquid,
- A and B are in two or more different tanks in two or more different vehicles, then
  - A and B are sprayed on the same soybeans on the same day,
  - A is sprayed and B is sprayed from one to three days after A has been sprayed,
  - B is sprayed and A is sprayed from one to three days after B has been sprayed.

The at least one organo-chemical fungicide in combination with the phytosterol composition is effective since the first application on soybean. In particular, this method is highly effective against Asian soybean rust, *cercospora* leaf blight, target spot, powdery mildew, anthracnose and end-of-cycle diseases such as purple seed stain and brown spot. This method is even more effective against Asian soybean rust.

The invention also relates to a method of using the composition or slurry as previously described to improve the effectiveness of phytopharmaceutical organo-chemical fungicides or biocontrol products, by increasing the harvest yield of soybeans treated with this method. The increase of the harvest yield is expected to be more than 10%, or more than 20%, or more than 50%, even more than 100%, or even more than 120% the harvest yield of soybeans under similar conditions but treated only with the organo-chemical fungicide treatment.

The invention further relates to a method of using the composition or slurry as previously described to improve the effectiveness of phytopharmaceutical organo-chemical fungicides or biocontrol products, by increasing the control of fungal diseases of soybean. The said increase of control of fungal disease is expected to be more than 2%, or more than 5%, or more than 10%, even more than 20%, or even more than 25% compared to soybeans under similar conditions but treated only with the organo-chemical fungicide treatment.

In practice, the at least one sucrose fatty acid ester, case the phytosterol uptake through the cuticle of soybean, then the soybean defense mechanism is triggered by the at least one phytosterol. Since soybean is first treated at a young stage (vegetative stage) whereas the whole plant is being protected against diseases when it grows, this shows that the at least one phytosterol activates systemic acquired resistance (SAR).

The invention also relates to a method of using the phytosterol composition or slurry as previously described to treat in a preventive or in a curative way other plant species, whose harvest yield may be decreased while exposed to *Phakopsora pachyrhizi* or other common fungal diseases. These other plant species belong to the family of Fabaceae, more precisely the subfamily Faboideae, even more precisely pea, fava bean, lupine, clover or fenugreek.

The invention and the benefits it produces are more visible in the following examples, which are given in order to illustrate the invention in a non-exhaustive fashion. In particular, the examples show that all the cultivars that have been tested show a positive response on the treatment with the composition of the invention.

EXAMPLES OF APPLICATION OF THE INVENTION

1. Preparation of a Phytosterol Composition Used in the Method of the Invention The formulation of the phytosterol composition used in the method of the invention is a suspo-emulsion comprising the compounds of Table 1.

TABLE 1

Phytosterol composition.

| Compound | Quantity (in wt %) |
|---|---|
| Phytosterols, CAS: 949109-75-5 | 2.5 |
| Sucrose stearate, CAS: 84066-95-5 | 6 (surfactant acting in oil-in-water emulsion) + 2 (free surfactant in suspension) |
| Polyethylene glycol, molar mass 400 g/mol | 3.5 |
| Methyl tetradecanoate | 0.4 |
| Water | 84.9 |
| Benzyl alcohol | 0.7 |
| Dv90 suspo-emulsion | 80 |

The various compositions according to the invention are manufactured comprising the following steps:

(i) Preparation at about 110° C. of a lipophilic phase comprising phytosterols, sucrose stearate, methyl tetradecanoate, and solvent, (ii) Preparation at a given temperature of a hydrophilic phase comprising water and benzyl alcohol if any, (iii) Mixing the lipophilic phase of step (i) with the hydrophilic phase of step (ii) and stirring until at least 90% of the volume of lipophilic droplets with a diameter comprised between 0.1 and 20 µm are obtained, with a maximum peak between 2 and 6 µm as determined by laser diffraction, (iv) Cooling the emulsion to ambient temperature of about 20° C., and (v) Adding sucrose stearate in the oil-in-water emulsion, at ambient temperature of about 20° C. and stirring until at least 90% of the particles with a diameter comprised between 10 and 250 µm are obtained and suspended in the aqueous phase, with a maximum peak between 10 µm and 1000 µm as determined by laser diffraction.

2. Agricultural Mixtures with Commercial Organo-Chemical Fungicides. Control of Asian Soybean Rust, Anthracnose, Purple Seed Stain and Brown Spot in Field Trials and Increase of the Harvest Yield The objective of the trial is to demonstrate the efficiency of a phytosterol composition comprising at least one phytosterol and at least one sucrose fatty acid ester, when combined with commercial organo-chemical fungicides against soybean diseases, i.e. asian soybean rust, anthracnose, purple seed stain and brown spot, when the phytosterol composition is applied twice, before and after emergence of the diseases.

a. Materials and Methods

Experiments were conducted with a phytosterol composition in the form of a suspo-emulsion of example 1. The following mixtures were prepared, each of them containing both DMI-based and $Q_o$I-based fungicides. Table 2 summarizes the different experiments. Four sequential applications of the products were performed, including one before flowering.

TABLE 2

Different experiments where the phytosterol composition is mixed with organo-chemical fungicides (treatments B-G). Sowing is at day 0.

| Experiment | Application number# | Mixture† | Dose (L/ha or kg/ha)* | Sterol rate (g/ha) |
|---|---|---|---|---|
| A | — | Untreated | — | 0 |
| B | 1 (day 51, stage V5) | Phytosterol composition | 2.0 | 50 |
| | | Strobilurin/triazole | 0.2 | |
| | | Chloronitrile | 1.0 | |
| | 2 (day 66, stage R1) | Carboxamide/strobilurin | 0.35 | 0 |
| | | Strobilurin | 1.5 | |
| | 3 (day 81, stage R3) | Carboxamide/triazole/strobilurin | 0.5 | 0 |
| | | Strobilurin | 1.5 | |
| | 4 (day 101, stage R5.3) | Strobilurin 2 | 0.2 | 0 |
| | | Triazole | 0.3 | |
| C | 1 | Strobilurin/triazole | 0.2 | 0 |
| | | Chloronitrile | 1.0 | |
| | 2 | Phytosterol composition | 2.0 | 50 |
| | | Carboxamide/strobilurin | 0.35 | |
| | | Strobilurin | 1.5 | |
| | 3 | Carboxamide/triazole/strobilurin | 0.5 | 0 |
| | | Strobilurin | 1.5 | |
| | 4 | Strobilurin 2 | 0.2 | 0 |
| | | Triazole | 0.3 | |

TABLE 2-continued

Different experiments where the phytosterol composition is mixed with organo-chemical fungicides (treatments B-G). Sowing is at day 0.

| Experiment | Application number# | Mixture† | Dose (L/ha or kg/ha)* | Sterol rate (g/ha) |
|---|---|---|---|---|
| D | 1 | Strobilurin/triazole | 0.2 | 0 |
| | | Chloronitrile | 1.0 | |
| | 2 | Carboxamide/strobilurin | 0.35 | 0 |
| | | Strobilurin | 1.5 | |
| | 3 | Phytosterol composition | 2.0 | 50 |
| | | Carboxamide/triazole/strobilurin | 0.5 | |
| | | Strobilurin | 1.5 | |
| | 4 | Strobilurin 2 | 0.2 | 0 |
| | | Triazole | 0.3 | |
| E | 1 | Phytosterol composition | 1.0 | 25 |
| | | Strobilurin/triazole | 0.2 | |
| | | Chloronitrile | 1.0 | |
| | 2 | Phytosterol composition | 1.0 | 25 |
| | | Carboxamide/strobilurin | 0.35 | |
| | | Strobilurin | 1.5 | |
| | 3 | Carboxamide/triazole/strobilurin | 0.5 | 0 |
| | | Strobilurin | 1.5 | |
| | 4 | Strobilurin 2 | 0.2 | 0 |
| | | Triazole | 0.3 | |
| F | 1 | Phytosterol composition | 1.0 | 25 |
| | | Strobilurin/triazole | 0.2 | |
| | | Chloronitrile | 1.0 | |
| | 2 | Carboxamide/strobilurin | 0.35 | 0 |
| | | Strobilurin | 1.5 | |
| | 3 | Phytosterol composition | 1.0 | 25 |
| | | Carboxamide/triazole/strobilurin | 0.5 | |
| | | Strobilurin | 1.5 | |
| | 4 | Strobilurin 2 | 0.2 | 0 |
| | | Triazole | 0.3 | |
| G | 1 | Strobilurin/triazole | 0.2 | 0 |
| | | Chloronitrile | 1.0 | |
| | 2 | Phytosterol composition | 1.0 | 25 |
| | | Carboxamide/strobilurin | 0.35 | |
| | | Strobilurin | 1.5 | |
| | 3 | Phytosterol composition | 1.0 | 25 |
| | | Carboxamide/triazole/strobilurin | 0.5 | |
| | | Strobilurin | 1.5 | |
| | 4 | Strobilurin 2 | 0.2 | 0 |
| | | Triazole | 0.3 | |
| H | 1 | Strobilurin/triazole | 0.2 | 0 |
| | | Chloronitrile | 1.0 | |
| | 2 | Carboxamide/strobilurin | 0.35 | 0 |
| | | Strobilurin | 1.5 | |
| | 3 | Carboxamide/triazole/strobilurin | 0.5 | 0 |
| | | Strobilurin | 1.5 | |
| | 4 | Strobilurin 2 | 0.2 | 0 |
| | | Triazole | 0.3 | |

#The treatments were performed the same day for all experiments.

†All mixtures contained an adjuvant for better efficacy. Strobilurin/triazole is Sphere Max ®; chloronitrile is Bravonil ®; carboxamide/strobilurin is Orkestra SC ™; strobilurin is Unizeb gold ®; carboxamide/triazole/strobilurin is Fox Xpro ®; strobilurin 2 is Sphere Max ®; triazole is Cypress 400EC ®.

*This value stands for the non-diluted product. All organo-chemical fungicides were diluted at their recommended dilution before being applied to soybeans.

All phytosterol compositions were diluted at 1% in water to prepare the slurry. The organo-chemical fungicides were tank-mixed together with the slurry of the said phytosterol compositions. Experiment A corresponds to an untreated control. All other treatments were conducted with the same sequence of organo-chemical fungicides, at the same field dose. Treatment H corresponds to a treated experiment with commercial organo-chemical fungicides only, according to standard agricultural practice. Treatments B-D are comparison examples where the phytosterol-based composition is applied once in the treatment sequence at a rate of 50 g/ha, at various stages. Treatments E-G are examples where the phytosterol composition is applied twice at a rate of 25 g/ha and in combination with at least two applications of at least one organo-chemical fungicide, at various stages. It is noteworthy that the same final concentration of phytosterols was applied in all treatments B-G.

Four different diseases were observed in this study: Asian soybean rust, anthracnose and end-of-cycle diseases, which consist in purple seed stain and brown spot. All were evaluated in terms of severity evolution with time. The data relating to disease severity were transformed by the square root test $\sqrt{x+k}$, and if significant, it was subjected to the Tukey test ($p<0.05$). The efficiency of treatments was calculated as: Efficiency (E %)=[(u−t)/u]×100 where u is the infestation (or severity) in the untreated control and t is the infestation (or severity) in the studied treatment.

b. Description of the Experimental Plot

The description of the experimental plot is presented in Table 3. The experimental plot was not subjected to drought or thermal stress.

TABLE 3

| Experimental plot | |
|---|---|
| Crop (variety) | Soybean (B53C22 Conventional) |
| Sowing density | 280,000 plants/ha |
| Soil type | Deep soil (silt/clay) |
| Experimental setup | Microplots (25 $m^2$) |
| Blooming (days after sowing) | Around day 60 |
| Harvest (days after sowing) | 130 |

c. Results i. Asian Soybean Rust

The results are given in Table 4. The efficiency of the treatment calculated at the last application is given either against the untreated experiment (A) or against the standard organo-chemical fungicide treatment (H).

TABLE 4

Control of Asian soybean rust

| Experiment | Asian soybean rust severity (%) Application 1 | Application 2 | Application 3 | Application 4 | Efficiency (%) Vs. A | Vs. H |
|---|---|---|---|---|---|---|
| A | 0 | 13.2 a | 34.4 a | 74.8 a | — | −205.3 |
| B | 0 | 4.1 bcd | 8.1 bc | 16.2 cde | 78.3 | 33.9 |
| C | 0 | 4.2 bcd | 8.8 bc | 18.5 bcd | 75.3 | 24.5 |
| D | 0 | 5.8 b | 11.6 b | 23.7 bc | 68.3 | 3.3 |
| E | 0 | 2.3 d | 4.9 c | 9.8 e | 86.9 | 60.0 |
| F | 0 | 3.1 d | 6.5 c | 13.1 de | 82.5 | 46.5 |
| G | 0 | 3.3 cd | 7.5 bc | 14.4 de | 80.7 | 41.2 |
| H | 0 | 5.8 bc | 12.5 b | 24.5 b | 67.2 | — |

ii. Anthracnose

The results are given in Table 5.

TABLE 5

Control of anthracnose

| Treatment | Anthracnose severity (%) Application 1 | Application 2 | Application 3 | Application 4 | Efficiency (%) Vs. A | Vs. H |
|---|---|---|---|---|---|---|
| A | 0 | 7.3 a | 14.7 a | 29.0 a | — | −181.6 |
| B | 0 | 1.8 b | 3.7 b | 7.9 b | 72.8 | 23.3 |

TABLE 5-continued

Control of anthracnose

| Treatment | Anthracnose severity (%) Application 1 | Application 2 | Application 3 | Application 4 | Efficiency (%) Vs. A | Vs. H |
|---|---|---|---|---|---|---|
| C | 0 | 2.1 b | 4.5 b | 8.6 bc | 70.3 | 16.5 |
| D | 0 | 2.3 b | 4.9 b | 9.5 bc | 67.2 | 7.8 |
| E | 0 | 1.0 b | 2.4 b | 5.0 c | 82.8 | 51.5 |
| F | 0 | 1.4 b | 2.8 b | 7.5 bc | 74.1 | 27.2 |
| G | 0 | 1.6 b | 3.7 b | 7.5 bc | 74.1 | 27.2 |
| H | 0 | 2.1 b | 4.8 b | 10.3 b | 64.5 | — |

iii. End-of-Cycle Diseases

The results are given in Table 6.

TABLE 6

Control of end-of-cycle diseases

| Experiment | End-of-cycle diseases severity (%) Application 1 | Application 2 | Application 3 | Application 4 | Efficiency (%) Vs. A | Vs. H |
|---|---|---|---|---|---|---|
| A | 0 | 8.5 a | 17.0 a | 37.3 a | — | −178.4 |
| B | 0 | 2.5 bc | 5.0 bcd | 10.5 bc | 71.8 | 21.6 |
| C | 0 | 2.9 b | 5.9 bc | 11.7 b | 68.6 | 12.7 |
| D | 0 | 3.0 b | 6.0 bc | 13.2 b | 64.6 | 1.5 |
| E | 0 | 1.3 c | 2.7 d | 6.1 c | 83.6 | 54.5 |
| F | 0 | 1.5 c | 3.4 cd | 7.0 c | 81.2 | 47.8 |
| G | 0 | 1.9 bc | 3.9 bcd | 8.5 bc | 77.2 | 36.6 |
| H | 0 | 2.0 bc | 6.3 b | 13.4 b | 64.1 | — |

d. Harvest Yield

The values of the harvest yield are given in Table 7. The relative values are expressed versus the untreated soybean (A) or versus the treatment performed with commercial organo-chemical fungicides, that is to say experiment H.

TABLE 7

Harvest yield

| Experiment | Harvest yield (kg/ha) | % harvest vs. A | % harvest vs. H |
|---|---|---|---|
| A - untreated | 2026 d | — | −48.2 |
| B | 4201 b | +107.4 | +7.2 |
| C | 4194 b | +107.0 | +7.0 |
| D | 3927 c | +93.8 | +0.2 |
| E | 4487 a | +121.5 | +14.5 |
| F | 4332 ab | +113.8 | +10.5 |
| G | 4294 ab | +111.9 | +9.6 |
| H | 3918 c | +93.4 | — |

e. Interpretation of Results

- Without any treatment against the soybean diseases (A), the harvest was reduced by 48% compared to the treated modality (H).
- No phytotoxicity of the treatments was observed in this experiment.
- Despite a very high intensity of Asian soybean rust (Table 4), all treatments allowed reducing the pressure of the disease from three up to eight times, with experiments B-G (which include the phytosterol composition) giving the best results.

Application number 1 (day 51) was performed before the emergence of any diseases; therefore, this application was preventive.

All treatments which include phytosterols performed better than the experiment H (no phytosterol composition), which consisted in a state-of-the-art treatment of soybean with commercial organo-chemical fungicides. Performing better means that both harvest yield and efficiency to control diseases were improved over treatment H.

Treatment E performed better than any other treatments. It consisted in two applications, performed during the first and second runs of the sequence of four applications. Treatment E was able to reduce both the severity of the diseases (i.e., increase the efficiency of the treatment) and showed the highest harvest yield.

Among the treatments which involve the use of phytosterols:

Double application of the phytosterol composition at half rate performed better than single application at full rate. Indeed, double application of the phytosterol composition has a synergistic effect in terms of increasing yield and controlling the severity of disease. Regarding Table 2:

Treatment E combines the timing of applications of treatment B with treatment C, each treatment having a sterol rate of 50 g/ha;

Treatment F combines the timing of applications of treatment B with treatment D, each treatment having a sterol rate of 50 g/ha; and Treatment G combines the timing of applications of treatment C with treatment D, each treatment having a sterol rate of 50 g/ha.

As a demonstration, treatment F induces a synergetic effect in controlling Asian soybean rust (see Table 5), since the efficiency of treatment F is 46.5% greater than the additivity of the effects of treatments B and D (i.e. 37.2%). The same applies to the other dual applications tested on other diseases. Besides, regarding harvest yield, treatment F induces a synergetic effect (see Table 8), since the "% harvest vs. treatment H" of treatment F is 10.5%, which is higher than the additivity of the effects of treatments B and D (i.e. 7.4%). The same applies to the other dual applications tested.

Early applications work better (applications 1 and 2, experiment E) rather than delayed applications (experiment G).

3. Agricultural Mixtures with Commercial Organo-Chemical Fungicides. Preventive and Curative Treatment Against Purple Seed Stain and Brown Spot in Field Trials and Increase of Harvest Yield The objective of the trial is to demonstrate the efficiency of a phytosterol composition combined comprising at least one phytosterol and at least one sucrose fatty acid ester, with commercial organo-chemical fungicides to improve the yield and to control the disease compared to an untreated, cultivated soybean, both in preventive and curative treatments, and the effect of these treatments on several parameters, such as phytotoxicity or chlorophyl content.

a. Materials and Methods

Experiments were conducted with a phytosterol composition from example 1 comprising an effective amount of boron and molybdenum, added as micro-nutrients, which was combined with a standard organo-chemical fungicide treatment. Table 8 summarizes the different experiments. The products were applied at different phenological stages.

TABLE 8

Different experiments where the phytosterol composition is mixed with organo-chemical fungicides (treatments B-G). sowing is at day 0.

| Experiment | Product | Dose according to application stage# (L/ha) V4 stage Day 26 | R1 stage Day 47 | R3 stage Day 68 | Total phytosterols (g/ha) |
|---|---|---|---|---|---|
| A | Untreated | — | — | — | — |
| B | Phytosterol | 2 | | | 50 |
| C | composition | | 2 | | 50 |
| D | | | | 2 | 50 |
| E | | 2 | 2 | | 100 |
| F | | 2 | | | 100 |
| G | | | 2 | 2 | 100 |

#See next Table for the timeline of the three applications.

Experiment A corresponds to an untreated control. In addition to the treatments with the composition of the invention, the field was also treated with commercial organo-chemical fungicides, which were applied the same day as the application of the phytosterol composition but not from the same tank mix. Table 9 summarizes the timeline of the three applications, which are part of a full cultural itinerary.

TABLE 9

Timeline of applications of commercial organo-chemical fungicides and/or product of the invention

| Day | Organo-chemical fungicide† (dose g or L/ha) | Application of phytosterols | Plant stage |
|---|---|---|---|
| 26 | Carboxamide/triazole/strobilurin (0.5) | Yes | V4 |
| | Flowering of soybean | | |
| 47 | Carboxamide/triazole/strobilurin (0.5) | Yes | R1 |
| 68 | Strobilurin (0.5) | Yes | R3 |
| 82 | Carboxamide/triazole/strobilurin (0.5) | No | |
| 97 | Strobilurin (0.5) | No | |

†Carboxamide/triazole/strobilurin is Fox Xpro ®; strobilurin is Azimut ®.

Two different diseases were considered in this study, which belong to the so-called end-of-cycle diseases: purple seed stain and brown spot; they were considered as a whole.

b. Description of the Experimental Plot

The description of the experimental plot is presented in Table 10. The experimental plot was not subjected to any drought or thermal stress.

TABLE 10

| Experimental plot | |
|---|---|
| Crop (variety) | Soybean (Brasmax Desafio) |
| Sowing density | 440,000 plants/ha |
| Soil type | Sand/clay |
| Experimental setup | Microplots (15 $m^2$) |
| Blooming (days after sowing) | Around day 46 |
| Harvest (days after sowing) | 120 |

c. Results i. End-of-Cycle Diseases

The protection efficiency of each experiment was controlled seven days after their application. The results are given in Table 11.

TABLE 11

Control of end-of-cycle diseases

| Experiment | Severity of end-of-cycle diseases (%) | | |
|---|---|---|---|
| | Application 1 | Application 2 | Application 3 |
| A - Untreated | 0 | 3.33 | 7.65 |
| B | 0 | 1.20 | 1.60 |
| C | 0 | 1.60 | 4.17 |
| D | 0 | 3.33 | 4.13 |
| E | 0 | 0.40 | 1.20 |
| F | 0 | 0.80 | 1.60 |
| G | 0 | 1.20 | 1.20 |

ii. Chlorophyll Content

The results of chlorophyll content given in Table 12 show a trend where the concentration is higher when the soybean has been treated with the phytosterol composition combined with organo-chemical fungicides. It means that the treated soybean has a better photosynthetic activity than the untreated. The analysis was performed 15 days after the last treatment.

TABLE 12

Chlorophyll content

| Experiment | Chlorophyll content | % vs. A |
|---|---|---|
| A - Untreated | 52.48 | — |
| B | 54.73 | +4.3 |
| C | 53.77 | +2.5 |
| D | 53.27 | +1.5 |
| E | 55.97 | +6.7 |
| F | 54.68 | +4.2 |
| G | 55.60 | +5.9 |

d. Harvest Yield

The values of the harvest yield are given in Table 13. The relative values are expressed versus the untreated experiment (A). The harvest yields were not statistically significant one to another.

TABLE 13

Harvest yield

| Experiment | Harvest yield (kg/ha) | % harvest vs. untreated (A) |
|---|---|---|
| A - Untreated | 3650.5 a | — |
| B | 3999.7 a | +9.57 |
| C | 3862.7 a | +5.81 |
| D | 3825.5 a | +4.79 |
| E | 4429.0 a | +21.33 |
| F | 4091.4 a | +12.08 |
| G | 4146.7 a | +13.59 |

e. Interpretation of Results

- The lowest harvest was obtained for the untreated experiment (A).
- No phytotoxicity of the treatments was observed in this experiment.
- Even if soybean diseases are known to affect leaves, by maintaining the chlorophyl content the phytosterol composition allows soybean to keep photosynthesis, thus allowing to increase the harvest yield.
- Treatment E performed better than the other treatments. Treatment H consisted in two applications at the highest rate of phytosterols sprayed on the plants (100 g/ha), performed during the first and second runs. Treatment H decreased the severity of the disease and showed the highest harvest yield.
- Among the treatments which involve the use of phytosterols:
  - A double application of phytosterols on the same soybean at two different stages gives better yields than treated said soybeans with a single application. Indeed, double application of the phytosterol composition has a synergistic effect in terms of increasing yield. Regarding Table 8:
    - Treatment E=treatment B+treatment C;
    - Treatment F=treatment B+treatment D; and
    - Treatment G=treatment C+treatment D.
  - As a demonstration, treatment E induces a synergetic effect in increasing the harvest yield (see Table 13), since the "% harvest" of treatment E is 21.33% which is greater than the sum of the effects of treatments B and C (i.e. 15.38%). The same applies to the other dual applications tested.
  - Early applications work better (applications 1 and 2, treatment H) rather than delayed applications.
  - Applications where the total of phytosterols sprayed to the plants was 100 g/ha performed better than 50 g/ha.

What is claimed:

1. A method of cultivating soybean exposed to at least one fungal disease comprising a step of applying to said cultivated soybean an effective treatment with at least one organo-chemical fungicide in combination with a phytosterol composition comprising at least one phytosterol and at least one sucrose fatty acid ester, wherein at least two applications of said phytosterol composition are combined with at least two applications of said treatment with at least one organo-chemical fungicide, and either wherein the treatment with said combination increases the yield of said cultivated soybean in comparison to soybeans under similar conditions treated only with the organo-chemical fungicide treatment, or wherein the treatment with said combination reduced the effects of said at least one fungal disease on said field of cultivated soybean in comparison to soybeans under similar conditions only treated with the organo-chemical fungicide treatment.

2. The method of claim 1, wherein said at least two applications of said phytosterol composition comprising at least one phytosterol and at least one sucrose fatty acid ester are applied between physiological stage V3 to R5 of the cultivated soybeans.

3. The method of claim 1, wherein said at least two applications of said phytosterol composition comprising at least one phytosterol and at least one sucrose fatty acid ester are applied between physiological stage R1 to R3.

4. The method of claim 1, wherein said at least two applications of said phytosterol composition comprising at least one phytosterol and at least one sucrose fatty acid ester is applied prior to, concomitantly, or after the application of the at least one organo-chemical fungicide.

5. The method of claim 1, wherein the effective treatment with at least one organo-chemical fungicide is a standard treatment with respect to regime and dosage as recommended for the treatment of soybean.

6. The method of claim 1, wherein the organo-chemical fungicide is selected from the group consisting of: strobilurins, chloronitriles, triazoles and carboxamides, and combinations thereof.

7. The method of claim 1, wherein said at least one fungal disease is caused by a fungus from the subkingdom Dikarya.

8. The method of claim 1, wherein said at least one fungal disease is caused by a fungus from the division Basidiomycota or Ascomycota.

9. The method of claim 1, wherein said at least one fungal disease is caused by a fungus from the class selected from Pucciniomycetes, Sordariomycetes, Dothideomycetes or Leotiomycetes.

10. The method of to claim 9, wherein said at least one fungal disease is selected from the group consisting of Asian soybean rust; anthracnose; end-of-cycle diseases, advantageously purple seed stain and brown spot; target spot; powdery mildew; *cercospora* leaf blight; and combinations thereof.

11. The method of claim 9, wherein said at least one fungal disease is Asian soybean rust.

12. The method of claim 1, wherein said at least one phytosterol is selected from the group consisting of: beta-sitosterol, campesterol, brassicasterol, stigmasterol, lanosterol, stigmastanol, campestanol, cycloartenol, gamma-sitosterol, Δ5-avenasterol, Δ7-avenasterol, isofucosterol, 5-dehydroepisterol, cycloartenol, clerosterol, sitostanol, stigmastadienol, cholesterol, cholestanol, dinosterol, ergosterol, obtusifoliol, and mixtures thereof.

13. The method of claim 12, wherein said at least one phytosterol is a mixture of phytosterols containing β-sitosterol.

14. The method of claim 13, wherein said at least one phytosterol is a mixture of phytosterols containing β-sitosterol, which represents at least 30% of the phytosterols mixture by weight, with the balance to 100% containing, where appropriate, campesterol, stigmasterol and brassicasterol.

15. The method of claim 1, wherein said at least one sucrose fatty acid ester is selected from the group consisting of: sucrose stearate, sucrose palmitate, their polyesters and mixtures thereof.

16. The method of claim 1, wherein the mass ratio between said at least one phytosterol and said at least one sucrose fatty acid ester is between 0.01 and 10.

17. The method of claim 1, wherein:

said at least one phytosterol represents between 0.2% and 10% of the composition by weight; and said at least one sucrose fatty acid ester represents between 0.2% and 10% of the composition by weight.

18. The method of claim 1, wherein the total concentration of said at least one phytosterol applied on cultivated soybean is between 2.5 g/ha to 250 g/ha.

19. The method of claim 1, wherein the total concentration of said at least one phytosterol applied on cultivated soybean is between 12.5 and 125 g/ha.

20. The method of claim 1, wherein the total concentration of said at least one phytosterol applied on cultivated soybean is between 25 g/ha and 100 g/ha.

* * * * *